Nov. 6, 1923.
G. A. WEGNER
1,473,065
TEMPERATURE CONTROLLING MEANS FOR ICE CREAM FREEZERS
Filed Nov. 25, 1921    2 Sheets-Sheet 1
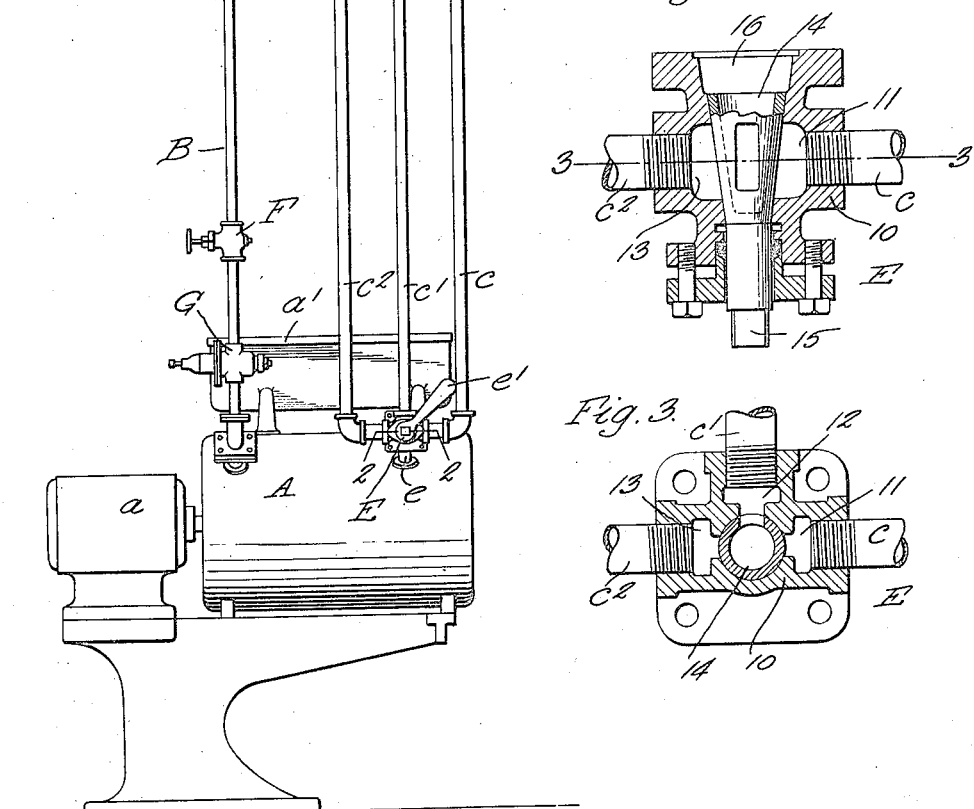
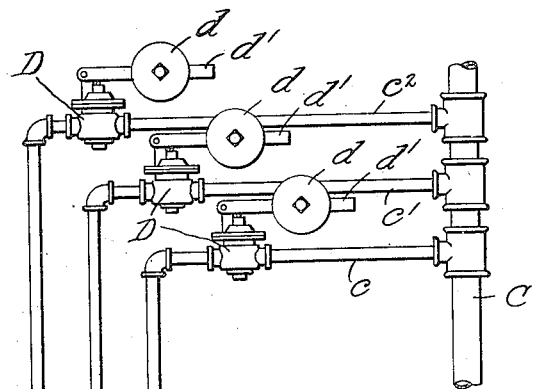
INVENTOR.
Gustave A. Wegner,
by Parker & Rockwood
his ATTORNEYS.

Nov. 6, 1923.
G. A. WEGNER
1,473,065
TEMPERATURE CONTROLLING MEANS FOR ICE CREAM FREEZERS
Filed Nov. 25, 1921    2 Sheets-Sheet 2
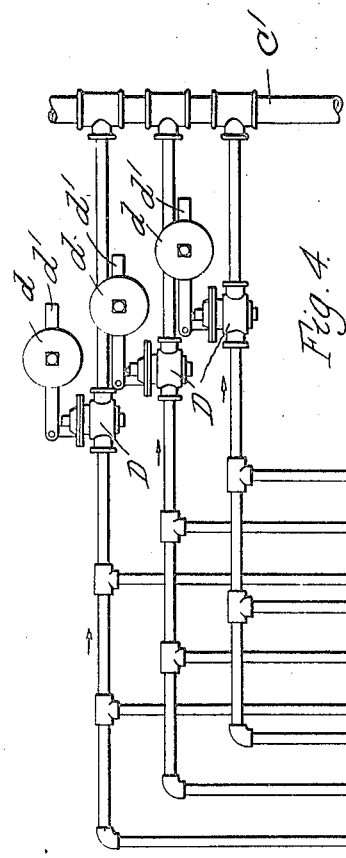
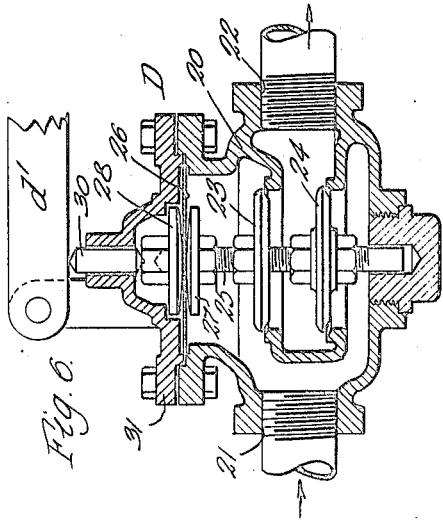
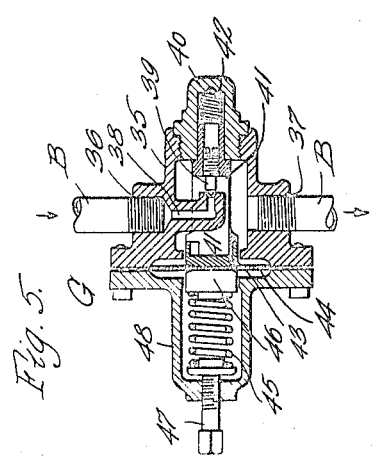
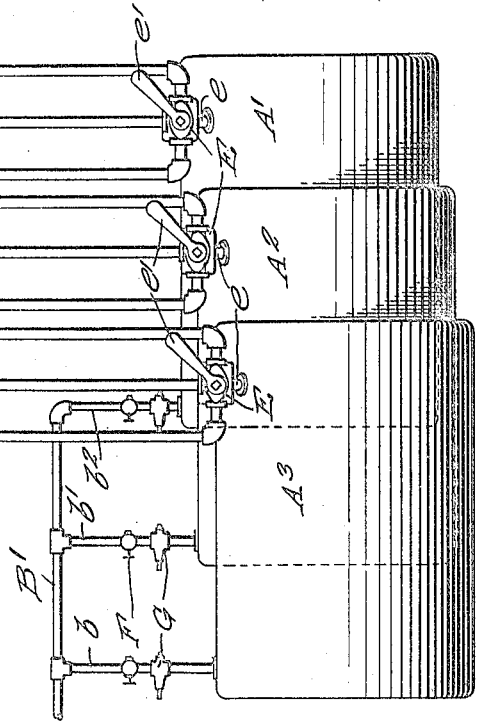
INVENTOR.
Gustave A. Wegner.
By Parker & Norwood
his ATTORNEYS.

Patented Nov. 6, 1923.

1,473,065

UNITED STATES PATENT OFFICE.

GUSTAVE A. WEGNER, OF ROCHESTER, NEW YORK.

TEMPERATURE-CONTROLLING MEANS FOR ICE-CREAM FREEZERS

Application filed November 25, 1921. Serial No. 517,525.

*To all whom it may concern:*

Be it known that I, GUSTAVE A. WEGNER, a citizen of the United States, residing at Rochester, in the county of Monroe and State of New York, have invented a new and useful Improvement in Temperature-Controlling Means for Ice-Cream Freezers, of which the following is a specification.

This invention relates to temperature controlling means for ice cream freezers or analogous devices in which it is desirable to vary the temperature at which the congealer operates.

It has been common heretofore to freeze ice cream and similar substances in congealers having double walls or a jacket in which brine is circulated to cause the congealing, and in such cases no particular difficulty is experienced in obtaining the various temperatures desired for congealing the mixture. It has, however, been found impractical heretofore to effect the congealing by introducing the refrigerant liquid directly into the jacket of the congealer owing to the difficulty experienced in obtaining the desired temperature variations during the congealing operations. For example, after a batch of material has been congealed at a temperature of about 8° F., the congealer must be operated for several minutes at a temperature of approximately 26° F., and the change from one temperature to another has heretofore not been satisfactorily accomplished in apparatus in which the refrigerant liquid was introduced directly into the freezer jackets.

The objects of this invention are to produce an apparatus of this kind by means of which the temperature of the refrigerant liquid in the jacket of the congealer may be readily controlled as desired; also to improve the construction of apparatus of this kind in other respects hereinafter specified.

In the accompanying drawings:

Fig. 1 is an elevation of a congealing apparatus and the temperature regulating mechanism therefor embodying my invention.

Fig. 2 is a fragmentary sectional plan view thereof, on an enlarged scale, on line 2—2, Fig. 1, of a controlling valve or cock.

Fig. 3 is a section thereof on line 3—3, Fig. 2.

Fig. 4 is an elevation of the temperature regulating apparatus showing the same applied to a plurality of congealers.

Fig. 5 is a section of an automatic stop valve used in connection with my apparatus.

Fig. 6 is a section of a back pressure valve used in connection with the apparatus.

Referring to Fig. 1 of the drawings, A represents the usual freezer or congealer which is provided with an evaporator which, in the construction shown, is in the form of a jacketed cylindrical wall within which the liquid refrigerant is evaporated, and $a$ represents any suitable means for rotating the usual paddles (not shown) within the freezer. The freezer is also provided with the usual storage tank or receptacle $a'$ in which a charge of liquid to be congealed may be contained in readiness to be admitted to the freezer. The refrigerant or congealing medium is admitted to the jacket or evaporator of the freezer A by means of a pipe B and is withdrawn from the jacket by means of a main suction or vapor discharge pipe C connected with a compressor or other means (not shown) for again converting the vapors of the refrigerant into liquid form. The main suction pipe C is connected with the jacket of the freezer by means of a plurality of branch pipes $c$ $c'$ $c^2$.

It is well known that the pressure to which a volatile liquid is subjected determines the boiling point of such liquid, and consequently, in order to obtain the desired temperatures within the jacket of the freezer or other evaporator, the pressure of the refrigerant liquid within the jacket must be such as to produce the corresponding temperature.

In order to produce an apparatus for controlling the temperatures within the evaporator or jacket of the freezer, which can be quickly actuated and shall require no skill on the part of the operator, the following construction is preferably provided:

Each of the several branch suction pipes $c$ $c'$ $c^2$ is provided with a back pressure valve or regulator D, which may be of any suitable or desired construction and the branch suction pipes are connected with a controlling valve or cock E. This valve is connected with the evaporator or jacket of the freezer by means of a pipe $e$ and is so constructed as to place the pipe $e$ into communication with any one of the several branch suction pipes. The several back pressure valves D are constructed or set in any desired manner to produce certain predetermined back pressures corresponding to the temperatures desired at the freezer jacket, the back pressure valves shown being provided for this purpose with weights $d$ adjustably arranged on arms $d'$. Consequently, in order to subject the freezer to the desired temperature, it is only necessary to turn the handle $e'$ of the controlling cock E in such a manner as to connect the pipe $e$ with the corresponding branch suction pipe.

The admission of the liquid refrigerant to the jacket or evaporator of the freezer may be controlled in the usual manner, a hand controlled valve F being preferably provide in the supply pipe B, and an automatic stop valve G is preferably also provided on this pipe, the object of which will be hereinafter explained.

The controlling valve or cock used may obviously be of any suitable or desired construction, that shown in Figs. 2 and 3 including a housing 10 having a plurality of outlet ports 11, 12 and 13 connected to the pipes $c$ $c'$ $c^2$ respectively. 14 represents a hollow cone or valve member which is carefully fitted into the housing 10 and which has an opening in its side adapted to register with any one of the outlet ports. The hollow cone is provided at one end with a stem 15 adapted to receive the handle $e'$ and the other end is open and connects with a passage 16 which is in communication with the pipe $e$ connecting with the jacket or evaporator of the freezer.

The back pressure valves shown in the drawings, see particularly Fig. 6, may be used in connection with this apparatus if desired, although other forms of back pressure valves may be employed. The back pressure valve shown includes a body or housing 20 having an inlet 21 and an outlet 22, and the flow of fluid from the inlet to the outlet of the valve is controlled by means of two valve disks 23 and 24 adapted to cooperate with seats formed in the valve housing. The valve disks are arranged on a stem 25, which is rigidly connected with a diaphragm 26 in any suitable manner, for example, by means of two disks 27 and 28 arranged at opposite sides of the diaphragm. The upper disk is engaged by means of a pin 30 projecting through a head 31 mounted on the valve housing and the outer end of the pin engages the lever $d'$ on which the weight $d$ is adjustably mounted. By placing the weight in the correct position on the lever $d'$, any desired back pressure, with in certain limits, can be provided at the inlet opening 21 of the valve, since the vapor in the inlet opening 21 exerts a pressure on the diaphragm and thus tends to lift the valve disks from their seats while the weighted lever opposes this tendency.

The automatic stop valve G may be of any usual or suitable construction, that shown including a housing or body 35 provided with inlet and outlet openings 36 and 37 respectively. The inlet opening terminates in a reduced orifice 38 having at its end a seat with which a valve 39 is adapted to cooperate. This valve is screwed or otherwise secured in one end of a yoke 41 which is guided at one end in the cap 40 in which the compression spring 42 is arranged. This spring tends to press the valve 39 against its seat. The opposite end of the yoke 41 terminates in a disk or bearing portion 43 which presses against a diaphragm 44. A coil spring 45 presses a disk 46 against the diaphragm in such a manner as to oppose the disk or bearing portion 43, the spring 45 and disk 46 being arranged in a cap 48 rigidly secured to the housing 35 and a threaded adjusting screw or stem 47 extends through a threaded hole in the cap 48 and bears against the spring 45 so that the pressure with which this spring bears against the diaphragm may be varied by adjusting the screw 47. It will be seen that this valve can be adjusted to stop the flow of liquid refrigerant to the evaporator whenever the pressure in the evaporator reaches a predetermined point. As will be hereinafter explained, this valve is adjusted in such a manner that the flow of liquid refrigerant to the evaporator is interrupted when the cock E is connected with that branch pipe which subjects the evaporator to the highest pressure.

In the manufacture of ice cream and the like, different mixtures to be frozen require different temperatures, but two different temperatures are most commonly used, one temperature being about 8° F. and the other about zero Fahrenheit, or a few degrees below zero, and in addition to these temperatures, the freezer must be operated for a short time with the admission of air to the mixture at a temperature of approximately 26° F. For this purpose, three back pressure valves and three branch pipes have been shown, but any desired number of these valves may be provided, as the occasion may require.

In the beginning of the operation of the apparatus, a certain amount of liquid ammonia is admitted to the jacket of the freezer by turning the controlling cock to an outlet, which will produce a pressure sufficiently low for valve G, to open. Then as soon, in the opinion of the operator, as sufficient liquid ammonia has been accumulated, the cock E is turned to the position producing 26° F. and the freezer is now ready to receive the material to be congealed. In a short time after the freezer has received the charge of liquid refrigerant, the cock is turned into a position to connect the evaporator with the branch pipe for producing the desired temperature at which the particular mixture in the freezer is to be congealed. When the congealing of the mixture is nearly completed, the controlling cock is moved back into the position in which the freezer is subjected to the temperature of about 26° F. For this purpose the cock must connect the congealer with a branch pipe having a much higher back pressure, and the automatic stop valve G is so adjusted that when the freezer is operating at this temperature, the pressure in the jacket of the freezer will be such as to cause the valve point 39 of the automatic stop valve to move to its seat and thus to stop the flow of refrigerant liquid to the evaporator.

In Fig. 4 is shown a diagram illustrating how the invention may be applied to advantage to a plurality of freezers. In this case A' A² A³ represent the freezers and C' represents the main suction pipe. In this case each of the several branch pipes is provided with sub-branch pipes leading from the branch pipes to each of the freezers, so that only one set of back pressure valves need be used for the entire battery of freezers and each freezer is provided with its own controlling cock or valve. The inlet pipe B' to the freezers is provided with branch pipes b b' b², each of which is provided with a hand controlled valve and also an automatic stop valve. By means of this arrangement each of the several freezers can be operated independently of the other freezers.

By means of the apparatus described, the operator can very easily change the temperature within the jacket of the freezer by setting the controlling cock into any of the several positions and no delicate adjustment of the several valves is required. The temperature in the freezer can, therefore, be controlled just as readily as has heretofore been done in connection with brine, and the apparatus, therefore, has the advantage that the evaporation of the liquid refrigerant takes place directly in the jacket of the freezer, thus producing a more efficient apparatus, and also avoiding the expense and the usual complication of the brine circulating system. Consequently the apparatus described is less expensive to construct and install than those heretofore used and is also more efficient in operation.

I claim as my invention:

1. Temperature controlling means for refrigerating devices, including an evaporator, means for supplying liquid refrigerant to said evaporator, a main suction pipe, a plurality of back pressure valves connected with said main suction pipe, each of said back pressure valves being adapted to produce a different back pressure, and means for connecting said evaporator with any of said back pressure valves to subject said evaporator to different pressures for producing different temperatures therein.

2. Temperature controlling means for refrigerating devices, including an evaporator, means for supplying liquid refrigerant to said evaporator, a main suction pipe, branch pipes connecting said main suction pipe with said evaporator, a back pressure valve in each of said branch pipes, each of said back pressure valves being adapted to produce a different back pressure, and means for placing any one of said branch pipes into communication with said evaporator and placing the other branch pipes out of communication therewith to subject the evaporator to different pressures for producing different temperatures therein.

3. Temperature controlling means for refrigerating devices, including an exaporator, means for supplying liquid refrigerant to said evaporator, a main suction pipe, a plurality of back pressure valves connected with said main suction pipe, each of said back pressure valves being adapted to produce a different back pressure, and a control valve for placing any one of said back pressure valves into communication with said evaporator to produce different temperatures therein.

4. Temperature controlling means for refrigerating devices, including an evaporator, means for supplying liquid refrigerant to said evaporator, a main suction pipe, branch pipes connected with said main suction pipe, a back pressure valve in each of said branch pipes, each of said back pressure valves being adapted to produce a different back pressure, and a control cock with which each of said branch pipes communicates and which is connected with said evaporator, said cock having a part which is movable to different positions to place any one of said branch pipes into communication with said evaporator.

5. Temperature controlling means for ice cream freezers and the like, including an evaporator forming a part of said freezer, a plurality of vapor discharge pipes adapted to be connected with said evaporator and each producing a different pressure in said evaporator, means for placing any one of said pipes into operative connection with said evaporator, a supply pipe for admitting liquid refrigerant into said evaporator, and an automatic stop valve in said supply pipe which is adapted to stop the flow of refrigerant to said evaporator when the evaporator is in communication with the pipe having the greatest pressure.

6. Temperature controlling means for ice cream freezers and the like, including an evaporator forming a part of said freezer, a main suction pipe, a plurality of branch pipes connected with said suction pipe, a back pressure valve in each branch pipe, each of said valves being adapted to create a different back pressure in said branch pipe, means for connecting any of said branch pipes with said evaporator, a supply pipe for admitting liquid refrigerant into said evaporator, and an automatic stop valve in said supply pipe which is adapted to stop the flow of refrigerant to said evaporator when the same is in communication with the branch pipe having the greatest back pressure.

7. Temperature controlling means for ice cream freezers and the like, including an evaporator forming a part of said freezer, means for supplying liquid refrigerant to said evaporator, a plurality of outlets for said evaporator, each of said outlets being connected with means for maintaining different evaporating pressures within said evaporator, and means for placing any one of said outlets into communication with said evaporator to produce predetermined temperatures in said freezer.

8. Temperature controlling means for ice cream freezers and the like, including an evaporator forming a part of said freezer, means for supplying liquid refrigerant to said evaporator, a plurality of outlets for said evaporator, each of said outlets being connected with means for maintaining different evaporating pressures within said evaporator, and a cock to which said outlets are connected and which communicates with said evaporator, said cock being readily adjustable to divert the outflowing vapors of the refrigerant from one outlet to another.

9. Temperature controlling means for ice cream freezers and the like, including an evaporator forming a part of said freezer, means for supplying liquid refrigerant to said evaporator, a plurality of outlets, any one of which may be connected with said evaporator, each of said outlets being connected with means for maintaining different evaporating pressures within said evaporator, and a device connected with said supply means for interrupting the supply of liquid refrigerant to said evaporator when said evaporator is in communication with the outlet which produces the greatest pressure in said evaporator.

10. Temperature controlling means for ice cream freezers and the like, including an evaporator forming a part of said freezer, means for supplying liquid refrigerant to said evaporator, a plurality of conduits in which definite pressures are maintained, and means operable at will for connecting said evaporator to any one of said conduits to produce a predetermined temperature in said freezer.

GUSTAVE A. WEGNER.